United States Patent
Triquet et al.

(10) Patent No.: US 12,431,967 B2
(45) Date of Patent: Sep. 30, 2025

(54) METHOD FOR THE COMPRESSION OF DATA COLLECTED BY A LEO SATELLITE FROM A PLURALITY OF IoT DEVICES AND THE TRANSMISSION TO A BASE STATION AND ASSOCIATED SYSTEM

(71) Applicant: EUTELSAT SA, Issy-les-Moulineaux (FR)

(72) Inventors: François Triquet, Issy-les-Moulineaux (FR); Matthieu Thiebaut, Issy-les-Moulineaux (FR); Julien Blancher, Issy-les-Moulineaux (FR)

(73) Assignee: EUTELSAT SA, Issy-les-Moulineaux (FR)

( * ) Notice: Subject to any disclaimer, the term of this patent is extended or adjusted under 35 U.S.C. 154(b) by 363 days.

(21) Appl. No.: 18/248,140

(22) PCT Filed: Oct. 7, 2020

(86) PCT No.: PCT/IB2020/001120
§ 371 (c)(1),
(2) Date: Apr. 6, 2023

(87) PCT Pub. No.: WO2022/074418
PCT Pub. Date: Apr. 14, 2022

(65) Prior Publication Data
US 2023/0412255 A1    Dec. 21, 2023

(51) Int. Cl.
H04B 7/185 (2006.01)
H04B 7/195 (2006.01)
H04L 69/04 (2022.01)

(52) U.S. Cl.
CPC ..... *H04B 7/18519* (2013.01); *H04B 7/18515* (2013.01); *H04B 7/195* (2013.01); *H04L 69/04* (2013.01)

(58) Field of Classification Search
None
See application file for complete search history.

(56) References Cited

U.S. PATENT DOCUMENTS

| 10,652,220 B1 | 5/2020 | Ramanujan |
| 2009/0161695 A1* | 6/2009 | Oh ........................ H04N 21/235 370/474 |

(Continued)

FOREIGN PATENT DOCUMENTS

WO    WO 99/21296 A1    4/1999

OTHER PUBLICATIONS

International Search Report as issued in International Patent Application No. PCT/IB2020/001120, dated Jun. 19, 2021.

*Primary Examiner* — Walter J Divito
(74) *Attorney, Agent, or Firm* — Pillsbury Winthrop Shaw Pittman LLP (57) ABSTRACT

A compression method for the storing and transmission of a plurality of pieces of data by a non-geostationary satellite to a ground-based station, the compression method including encoding the pieces of data in a predefined frame format, the encoding including creating a frame including at least one global header including at least one parameter field, the parameter field including a reference value of a parameter, upon receiving at least one piece of data of the plurality of pieces of data, adding at least one data packet to the frame, the data packet including: a packet header including at least one delta parameter field, the delta parameter field including the difference value between the value of the parameter for the received piece of data and the reference value of the parameter of the global header, a data payload including at least part of the received piece of data.

11 Claims, 4 Drawing Sheets

(56) References Cited

U.S. PATENT DOCUMENTS

2010/0161824 A1* 6/2010 Viger .................. H04L 12/4633
                                                       709/231
2017/0289822 A1    10/2017 Hreha et al.
2021/0297699 A1*  9/2021 Iguchi .................... G06T 9/001

* cited by examiner

| offset byte | byte bit | 0 | | | | | | | | 1 | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | 0 | H_id | Reserved | | | | | | | Version | | | | | | | |
| 2 | 16 | Ref_SNR | | | | | | | | Ref_RSSI | | | | | | | |
| 4 | 32 | Ref_timestamp | | | | | | | | | | | | | | | |
| 6 | 48 | Ref_timestamp (cont) | | | | | | | | | | | | | | | |
| 8 | 64 | Ref_Freq | | | | | | | | | | | | | | | |
| 10 | 80 | Ref_Freq (cont) | | | | | | | | | | | | | | | |

METHOD FOR THE COMPRESSION OF DATA COLLECTED BY A LEO SATELLITE FROM A PLURALITY OF IoT DEVICES AND THE TRANSMISSION TO A BASE STATION AND ASSOCIATED SYSTEM

CROSS-REFERENCE TO RELATED APPLICATIONS

This application is the U.S. National Stage of PCT/IB2020/001120, filed Oct. 7, 2020. The content of this application is incorporated herein by reference in its entirety.

TECHNICAL FIELD

The technical field of the invention is the field of communications in systems comprising non-geostationary satellites and ground-based devices.

The present document concerns methods for the compression of data collected by a non-geostationary satellite from a plurality of resource-constrained devices and the transmission from the non-geostationary satellite to a base station and associated system, and particularly wherein the non-geostationary satellite is a low earth orbit ("LEO") satellite.

STATE OF THE ART

With the development of Internet of Things ("IoT") networks and Low-Power Wide-Area Networks ("LP-WAN"), Low Earth Orbit satellites constellations have been found to be of interest as they particularly well integrate with such systems. Indeed, LEO satellites allow a global coverage starting from just one satellite. LEO satellites constellations are for example used for data collection, to retrieve data from parts of LPWAN or IoT networks and to deliver the data to other parts of said networks.

Most of the time, these constellations are used to retrieve data from ground-based objects unable to communicate with the rest of the network due to their location, and to deliver said data to ground-based stations of the network to make the data accessible by the rest of the network. The objects emit messages to the LEO satellites when in radio visibility of a satellite and the LEO satellites emit the messages to the ground-based stations when in radio visibility of a ground-based station. The LEO satellites constellations are therefore used as relays in the systems comprising the constellation and a LPWAN or IoT network.

In the majority of these systems, such as Argos®, Orbcomm® etc., the coverage offered by the LEO constellation is not constant, meaning that the object does not always have a LEO satellite in radio visibility in order to transmit its messages. The LEO satellites thus only receive messages from the ground-based devices when it passes over a ground-based device.

A LEO satellite receiving messages can aggregate the messages, to transmit them when it passes over a ground-based station. The batch of messages to be sent from a LEO satellite can be bulky, for example comprising thousands of messages, as it comprises all the messages received during one orbital period. This transmission requires a lot of bandwidth, as well as flexible amounts of storage. Indeed, the quantity of collected pieces data is not the same at each orbital period, meaning that for some orbital periods great amounts of storage space is needed while for some other orbital periods low amounts of storage space is needed. This results in an inefficient use of storage space on the LEO satellite's side.

There is therefore a need for a solution to efficiently store multiple pieces of data collected from IoT devices by a LEO satellite while requiring less bandwidth for the transmission of said data by the LEO satellite to a ground-based station.

SUMMARY OF THE INVENTION

The present document solves the above-mentioned problems by providing solutions for a lower storage need on the satellite side and for a lower bandwidth use to transmit data to a ground-based station from a non-geostationary satellite.

According to a first aspect of the invention, this is satisfied by providing a compression method for the storing and transmission of a plurality of pieces of data by a non-geostationary satellite to a ground-based station, the compression method comprising encoding the pieces of data in a predefined frame format, the encoding comprising:
  creating a frame comprising at least one global header comprising at least one parameter field, the parameter field comprising a reference value of a parameter,
  upon receiving at least one piece of data of the plurality of pieces of data, adding at least one data packet to the frame, the data packet comprising:
    A packet header comprising at least one delta parameter field, the delta parameter field comprising the difference value between the value of the parameter for the received piece of data and the reference value of the parameter of the global header,
    A data payload comprising at least part of the received piece of data.

Thanks to the invention, bandwidth used to transmit the plurality of messages is reduced as compared to known solutions of the state of the art, as the messages are compressed according to the invention. The messages can be compressed as they are received and concatenated to the already compressed previously received messages. That way, the compression can be "on-the-fly" and not all at once before transmitting.

In the invention, the global header and the packet header can comprise several parameter fields. The parameter(s) can be for example, but not limited to, a timestamp, the RSSI (Received Signal Strength Indicator), the SNR (Signal to Noise Ratio), the frequency. Storing for each received packet the difference between the value of a parameter in a global header and the value of the parameter instead of storing for each received packet the actual value of the parameter permits to store and transmit less information, dividing the size of the parameter to store. Having a global header further permits to store and transmit information once in the global header instead of for every packet to store and transmit.

The compression method according to the invention also permits to streamline the storing of the messages by the non-geostationary satellite, as not all the stored messages are transmitted at each pass over a ground-based station, but only a predefined amount of records.

The method according to the first aspect of the invention may also have one or more of the following characteristics, considered individually or according to any technically possible combinations thereof:
  the parameter is a frequency, a timestamp, a RSSI or an SNR,
  the frame is a binary frame.
  the method further comprises a step of transmitting, to the ground-based station, the frame.
  the frame format comprises a size parameter, the size parameter comprising a maximum size for the data payload of the data packet, and in that, upon receiving the at least one piece of data, the method first comprises a sub-step of fragmenting the received piece of data into a plurality of data payloads as a function of the size parameter and a plurality of data packets are added to the frame.

the steps of the method are carried out for each change of the reference value of the parameter of the global header.

Another aspect of the invention relates to a non-geostationary satellite configured to carry out the method according to the invention.

The non-geostationary satellite may also be a low Earth orbit satellite.

Another aspect of the invention relates to a communication system comprising a least one non-geostationary satellite according to the invention and at least one ground-based station.

According to one embodiment of the invention, the communication system further comprises at least one ground-based device.

Another aspect of the invention relates to a computer program product comprising instructions which, when the program is executed by a computer, cause the computer to carry out the steps of the method according to any one of the embodiments of the invention.

Another aspect of the invention relates to a computer-readable medium comprising instructions which, when executed by a computer, cause the computer to carry out the steps of the method according to any one of the embodiments of the invention.

The invention finds a particular interest in the collection of sensor data from IoT devices by a LEO satellite, as this type of data can be created in large numbers and can take space to be stored in the LEO satellite and bandwidth to be transmitted to a base station.

BRIEF DESCRIPTION OF THE FIGURES

Other characteristics and advantages of the invention will become clear from the description that is given thereof below, by way of indication and in no way limiting, with reference to the appended figures, among which.

DETAILED DESCRIPTION

For greater clarity, identical or similar elements are marked by identical reference signs in all of the figures.

Figure 1:
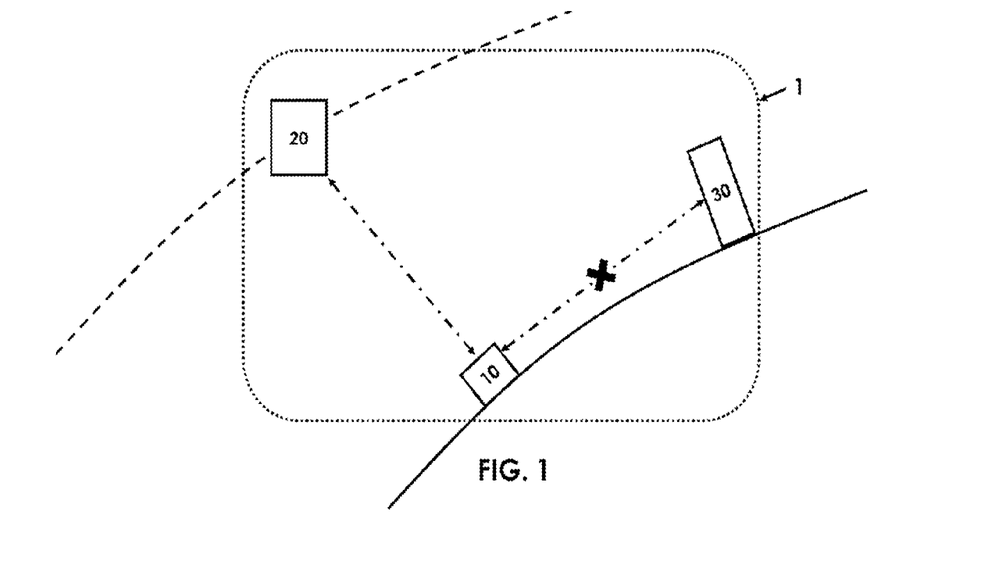
FIG. 1 is a schematic representation of a communication system according to the invention.

FIG. 1 shows a schematic representation of the communication system 1 implementing the method according to the invention. The communication system 1 comprises a ground-based device 10, a non-geostationary satellite 20 and a ground-based station 30.

The non-geostationary satellite 20 is a satellite orbiting a celestial body such as the Earth. When the non-geostationary satellite 20 orbits the Earth, it can then be a Low Earth Orbit (LEO) satellite (with an orbit altitude below 2000 km) or a Medium Earth Orbit (MEO) satellite (with an orbit altitude above 2000 km and below geosynchronous orbit). The non-geostationary satellite 20 comprises at least a processor and a memory, the memory storing instructions which, when executed by the processor, cause the processor to carry out steps of the methods described later. The non-geostationary 20 further comprises at least one communication payload, the communication payload comprising at least one transponder configured to receive and send signals towards the celestial body. The signal can be sent in spot beams of different width, for example 40 or 60 degrees (satellite beam half Field of View).

The ground-based device is a device comprising at least a processor and a memory, the memory storing instructions which, when executed by the processor, cause the processor to carry out steps of the methods described later. Preferably, the ground-based device 10 is a mobile device, meaning that the device is able to be moved for example by having a low weight or by comprising means making it able to be moved. Preferably, the ground-based device 10 is a resource-constrained device. It is understood by a resource-constrained device a device comprising a limited processor and/or limited memory such as a low-cost processor and/or a low-cost memory or such as an Internet of Things device, able to connect to an IoT network such as a Sigfox® network, a Lora® network or any other network permitting to link IoT devices. Further, the ground-based device comprises at least a communication module configured to communicate, that is to receive and send signals, at least with the non-geostationary satellite 20. Further, the communication module of the ground-based device 10 can be configured to communicate through a ground-based IoT network or through any other network, via wired means or wirelessly, for example towards a ground-based station 30. To communicate through a ground-based IoT network or through any other network, via wired means or wirelessly, for example towards a ground-based station 30, the ground-based device 10 can comprise another communication module. In the example represented at FIG. 1, the ground-based device 10 is unable to reach the ground-based station 30 directly or to reach a network permitting to reach the ground-based station 30. The ground-based device 10, preferably resource-constrained, is able to reach the non-geostationary satellite 20 using any wireless mean.

Figure 2:
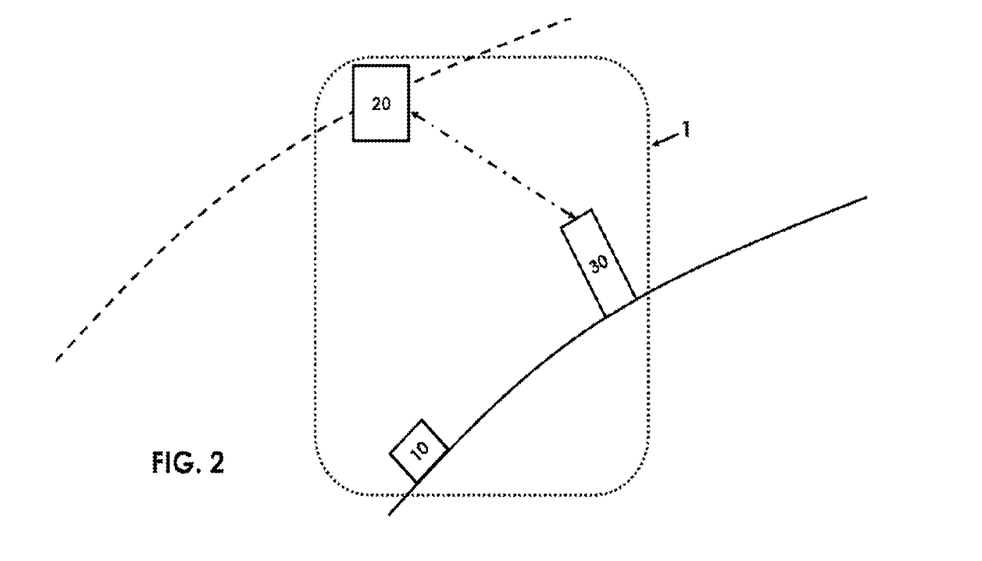
FIG. 2 is another schematic representation of the communication system according to the invention.

The ground-based station 30 is a device comprising at least a processor and a memory, the memory storing instructions which, when executed by the processor, cause the processor to carry out steps of the methods described later. Preferably, the ground-based station 30 is fixed, meaning that the device is not able to be moved. The ground-based station 30 can also be mobile, meaning that it can be moved. Preferably, the ground-based station 30 is linked to a network to transmit information received from non-geostationary satellites 20. Preferably, the ground-based station 30 is not a resource-constrained device, as it would be required to perform computing, storing and data transmission. Preferably, the ground-based station 30 is able to connect to an IoT network such as a Sigfox® network, a Lora® network or any other network permitting to link IoT devices. Further, the ground-based station 30 comprises at least a communication module configured to communicate, that is to receive and send signals, at least with the non-geostationary satellite 20. Further, the communication module of the ground-based station 30 can be configured to communicate through a ground-based IoT network or through any other network, via wired means or wirelessly, for example towards another ground-based station, towards a ground-based device, or towards a data center. To communicate through a ground-based IoT network or through any other network, via wired means or wirelessly, the ground-based station 30 can comprise another communication module. In the example represented at FIG. 2, the ground-based station 30 is able to reach the non-geostationary satellite 20 using wireless means.

Figure 3:
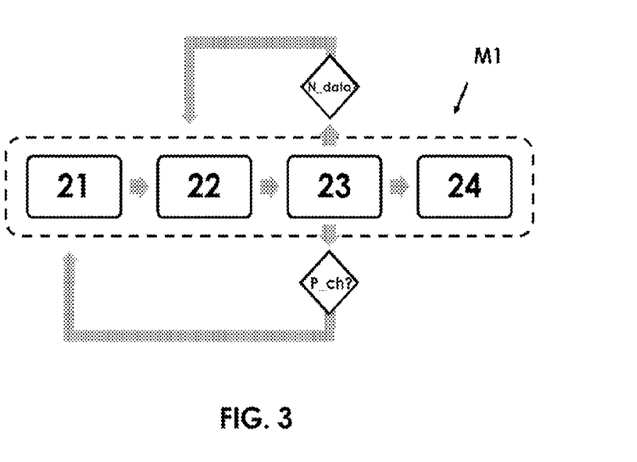
FIG. 3 is a schematic representation of a method according to the invention carried out by a non-geostationary satellite.

A first method according to the invention is represented FIG. 3. The method M1 represented FIG. 3 is carried out by the non-geostationary satellite 20 and comprises four steps. The method M1 is a compression method for the storing and transmission of a plurality of pieces of data by the non-geostationary satellite 20 to the ground-based station 30, the compression method M1 comprising encoding the pieces of data in a predefined frame format. Preferably, the pieces of data of the plurality of pieces of data have been sent preferably from resource-constrained devices 10.

In a first step 21 of the method M1, the non-geostationary satellite 20 creates a frame comprising at least one global header comprising at least one parameter field, the parameter field comprising a reference value of a parameter. Preferably, the frame is a binary frame. The parameter can be any parameter linked to signals received later. For example, parameters can include but are not limited to a timestamp, for example the time at which the frame or the global header was created, a reference RSSI (Received Signal Strength Indicator) such as an expected RSSI for future received signals, a reference frequency, such as an expected frequency for future received signals or the starting frequency of the expected radio channel in Hz, a reference SNR (Signal to Noise Ratio), such as an expected SNR for future received signals. It can be understood by a "reference" value of a parameter or by an "expected" value of a parameter a mean value for the parameter in a system operating in a normal manner. It can also be understood to be any value expected to be received or any value that can be compared to a future received value. Preferably, the global header comprises parameter field(s) for each parameter that is wished to be transmitted to the ground-based station 30. Preferably again, the global header comprises parameter field(s) for each parameter that is longer to be stored in the chosen format, for example in a binary format, than the mean difference that will be stored. For example, storing an RSSI can take up to 1 byte or more, while storing the difference between a reference RSSI and the RSSI of a received signal can take 5 bits or even less depending on the difference in value.

Figure 4:
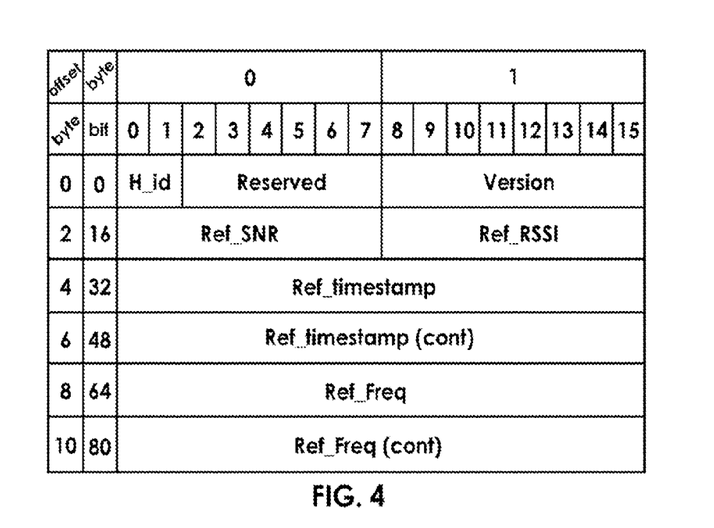
FIG. 4 is a schematic representation of exchanges between different entities of the communication system according to the invention.

An example of a global header is represented at FIG. 4. The example of global header represented at FIG. 4 is in no way a limitation of the invention. The global header represented at FIG. 4 comprises four parameter fields, each parameter field comprising the value of a reference parameter. Thus, the global header comprises a reference SNR Ref_SNR, a reference RSSI Ref_RSSI, a reference timestamp of the time of creation of the global header Ref_timestamp, a reference frequency Ref_Freq. The global header can further comprise an identifier H_id to identify the type of header, i.e. whether it is a global header or a packet header, as it will be seen later. It is possible to avoid the identifier if the global header G_header comprises the number of data packets attached to it. The global header can further comprise a version field, to be able to update the frame format.

Figure 7:
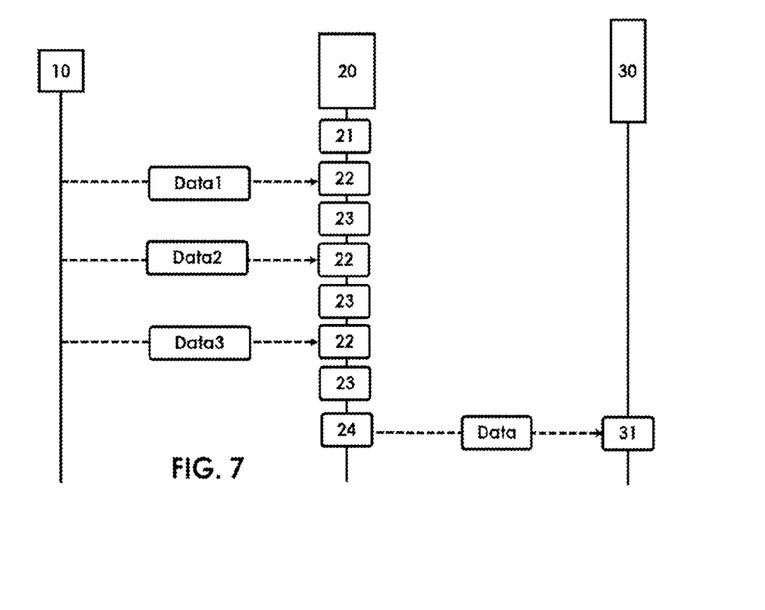
FIG. 7 is a schematic representation of an example of a packet header of a frame format according to the invention.

In a second step 22, the non-geostationary satellite 20 receives at least one signal. The received signal comprises at least one piece of data Data1 as represented at FIG. 7. It is understood by "piece of data" any piece of information that can be processed, stored and transmitted. Preferably, the signal was sent by the ground-based, resource-constrained, device 10. Preferably, a piece of data is an information related to the ground-based device 10, or created by the ground-based device 10. For example, a piece of data can be a measurement of a physical quantity performed by the ground-based device 10, for example using a sensor, or can be related to the state of the ground-based device 10, or can be any piece of data that has to be transmitted to a network unreachable directly by the ground-based device 10. The step 21 of receiving a signal can comprise a sub-step (not represented) of demodulating the signal using a demodulator module comprised in the non-geostationary satellite 20.

In a third step 23, upon receiving at least one piece of data of the plurality of pieces of data, the non-geostationary satellite 20 adds at least one data packet to the frame, the data packet comprising:

A packet header comprising at least one delta parameter field, the delta parameter field comprising the difference value between the value of the parameter for the received piece of data and the reference value of the parameter of the global header, A data payload comprising at least part of the received piece of data.

Figure 5:
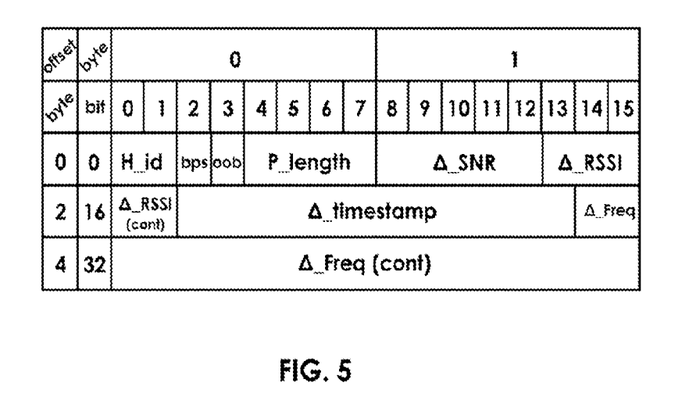
FIG. 5 is a schematic representation of a step of the method according to the invention.

An example of a packet header is represented at FIG. 5. The example of packet header represented at FIG. 5 is in no way a limitation of the invention. The packet header represented at FIG. 5 comprises four delta parameter fields, each delta parameter field comprising the difference value between the value of the parameter for the received piece of data and the reference value of the parameter of the global header. For example, and as represented at FIG. 5, the packet header can comprise a delta SNR field Δ_SNR, that is the difference value between the SNR of the received signal and the reference SNR of the global header to which the data packet will be concatenated or attached. For example, and as represented at FIG. 5, the packet header can comprise a delta RSSI field Δ_RSSI, that is the difference value between the RSSI of the received signal and the reference RSSI of the global header to which the data packet will be concatenated or attached. For example, and as represented at FIG. 5, the packet header can comprise a delta timestamp field Δ_timestamp, that is the time difference between a time linked to the received signal such as the time of emission or of reception of the signal, and the reference timestamp of the global header such as the time of creation of the global header or any other reference timestamp. For example, and as represented at FIG. 5, the packet header can comprise a delta frequency field Δ_freq, that is the difference value between the frequency of the received signal in Hz and the reference frequency of the global header to which the data packet will be concatenated or attached. The packet header can further comprise an identifier H_id to identify the type of header, i.e. whether it is a global header or a packet header. It is possible to avoid the identifier if the global header G_header comprises the number of data packets attached to it. This allows further reducing the storage and bandwidth needed. The packet header can further comprise a "bps" field indicating the data rate in bits per second, for example by using 0b0 to represent 100 bps and 0b1 to represent 600 bps. The packet header can further comprise a "oob" field indicating if the message has been demodulated out of band, for example by using 0b0 if the message has been received in band and 0b1 if the message has been received out of band. The packet header can further comprise a p_length parameter field indicating the length of the data payload following the packet header.

Figure 6:
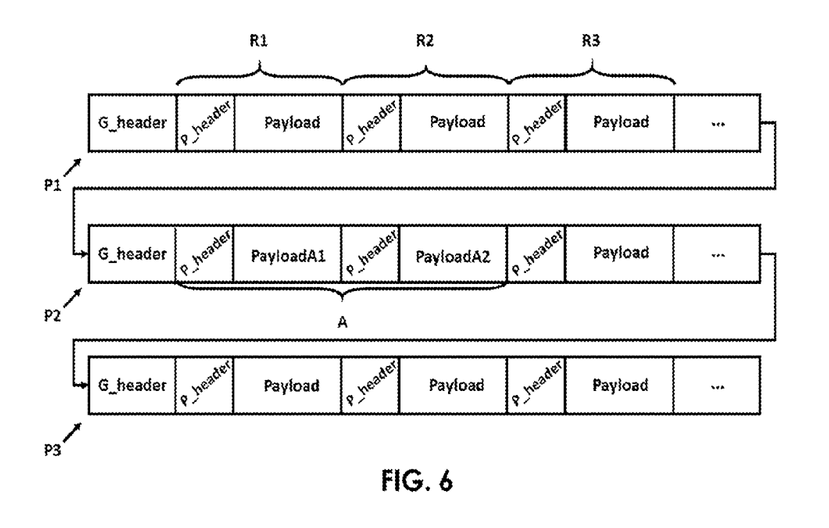
FIG. 6 is a schematic representation of an example of a global header of a frame format according to the invention.

It is understood by "adding to the frame" concatenating to the frame or attaching after the global header the data packet. For example, as represented at FIG. 6, adding to the frame P1 a data packet R1 after the first global header G_header results in a frame P1 comprising a global header G_header, a packet header p_header and a payload Payload. Upon receiving another signal, as represented at FIG. 7, that is upon receiving another piece of data Data2 from for example another ground-based device resource-constrained device 10, the steps 22 and 23 are reiterated, i.e. another data packet R2 is added with its own delta values in its p_header and its own payload. That is also represented at FIG. 3 with the "N_data?" arrows indicating the reception of new data.

The global header G_header can define a maximum number of data packets that can be attached to it or a maximum size that can be attached to it. If the maximum number of data packets or the maximum size is reached, the method M1 can restart at the first step 21 of creating a frame P2, another global header G_header can be created and a new data packet can be added to P2 after the global header G_header. This maximum number of data packets or maximum size is limited to a maximum time gap between the first message and the last message included under a G_header, which is for example about 1 hours and 8 minutes.

When the non-geostationary satellite 20 passes over a ground-based station 30, the method M1 can comprise a step 24 of transmitting the created frame or the created frames from the non-geostationary satellite 20 to the ground-based station 30.

The reference value of the parameter can change. For example, when a new reference frequency has to be used because the non-geostationary satellite 20 passes over a new region and the new region has a different regulatory frequency than the previous region the non-geostationary satellite 20 passed over, the reference frequency Ref_Freq of the global header G_header has to be changed or that could lead to larger value differences and therefore to storing more data than necessary. When the reference value of the parameter changes or has to be changed, a new global header G_header has to be created. The steps 21 to 23 of the method are reiterated, i.e. a new global header G_Header and a new frame are created. This is represented at FIG. 3 with the "P_ch?" arrows indicating a reference parameter change. The reference timestamp can also be changed every given period, so as not to store too long time differences. For example, the Δ_timestamp parameter can have a range of [0; 4095], meaning that the reference timestamp ref_timestamp of the global header G_Header has to be changed every 4095 unit (for example second or millisecond depending on the chosen unit).

Figure 8:
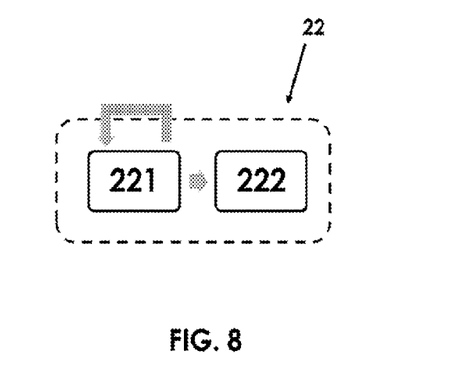
FIG. 8 is a schematic representation of an example of fragmentation of a piece of data into several data payloads according to the invention.

In an embodiment, the global header G_Header can comprise a size parameter p_length comprising a maximum size of the packet or a maximum size of the payload of the data packet. The step 22 of the method M1 can then be divided in two sub-steps, as represented at FIG. 8: a sub-step 221 of fragmenting a received piece of data into a plurality of data payloads as a function of the size parameter and a sub-step 222 of adding the plurality of data packets to the frame.

In a first sub-step 221 of step 22, a received piece of data, for example received from a ground-based device 10, is fragmented into a plurality of other pieces of data as a function of the size parameter p_length. That is, if the maximum data payload size defined by the size parameter p_length is of 24 bits, and if the piece of data is 48 bits-long, the piece of data is fragmented into two pieces of data.

In a second sub-step 222 of step 22, the pieces of data created from the fragmentation of the received piece of data are formatted in a data packet, each data packet being added to the frame and comprising a packet header and a data payload. For example, as represented at FIG. 6, the received piece of data A is fragmented into two pieces of data A1 and A2 and is formatted as two data packets, the first data packet comprising the payload PayloadA1 comprising A1 and the second data packet comprising the payload PayloadA2 comprising A2.

The method M1 according to the invention permits to compress the received data by formatting the received data in a particular format. The format keeps consistency of data related to the received data. The data related to received pieces of data can also be called parameters or "meta-data". By only storing the formatted data less storage space is used as compared to storing raw received pieces of data and raw associated metadata.

The non-geostationary satellite 20 orbiting a celestial body such as the Earth collects data from ground-based device 10, for example from resource-constrained devices. As it receives pieces of data, the non-geostationary satellite 20 formats the received pieces of data and concatenates them to the created frame. After for example one orbital period, the non-geostationary satellite 20 passes over a ground-based station 30 and transmits the frame or frames created during the collection of data. It therefore clears up its storage for data collection during the next orbital period to come. During one orbital period, the non-geostationary satellite 20 can also pass over several ground-based stations 30 and have a more important data collection capacity as it clears up at least part of its storage every time it passes over a ground-based station 30.

The invention claimed is:

1. A compression method for storing and transmission of a plurality of pieces of data by a non-geostationary satellite to a ground-based station, the compression method comprising encoding the pieces of data in a predefined frame format, the encoding comprising:
   creating a frame comprising at least one global header comprising at least one parameter field, the parameter field comprising a reference value of a parameter,
   upon receiving at least one piece of data of the plurality of pieces of data, adding at least one data packet to the frame, the data packet comprising:
   a packet header comprising at least one delta parameter field, the delta parameter field comprising a difference value between the value of the parameter for the received piece of data and the reference value of the parameter of the global header,
   a data payload comprising at least part of the received piece of data.

2. The compression method according to claim 1, wherein the parameter is a frequency, a timestamp, a RSSI or an SNR.

3. The compression method according to claim 1, wherein the frame is a binary frame.

4. The compression method according to claim 1, further comprising transmitting, to the ground-based station, the frame.

5. The compression method according to claim 1, wherein the frame format comprises a size parameter, the size parameter comprising a maximum size for the data payload of the data packet, and wherein, upon receiving the at least one piece of data, the method first comprises a sub-step of fragmenting the received piece of data into a plurality of data payloads as a function of the size parameter and a plurality of data packets are added to the frame.

6. The compression method according to claim 1, wherein steps of the method are carried out for each change of the reference value of the parameter of the global header.

7. A non-geostationary satellite configured to carry out the method according to claim 1.

8. The non-geostationary satellite according to claim 7, wherein the non-geostationary satellite is a low Earth orbit satellite.

9. A communication system comprising at least one non-geostationary satellite according to claim 7 and at least one ground-based station.

10. The communication system according to claim 9, further comprising a ground-based device.

11. A non-transitory computer-readable medium comprising instructions which, when executed by a computer, cause the computer to carry out the method according to claim 1.

* * * * *